A. KONARSKI.
NUTCRACKER.
APPLICATION FILED MAY 22, 1911.
1,003,917.
Patented Sept. 19, 1911.
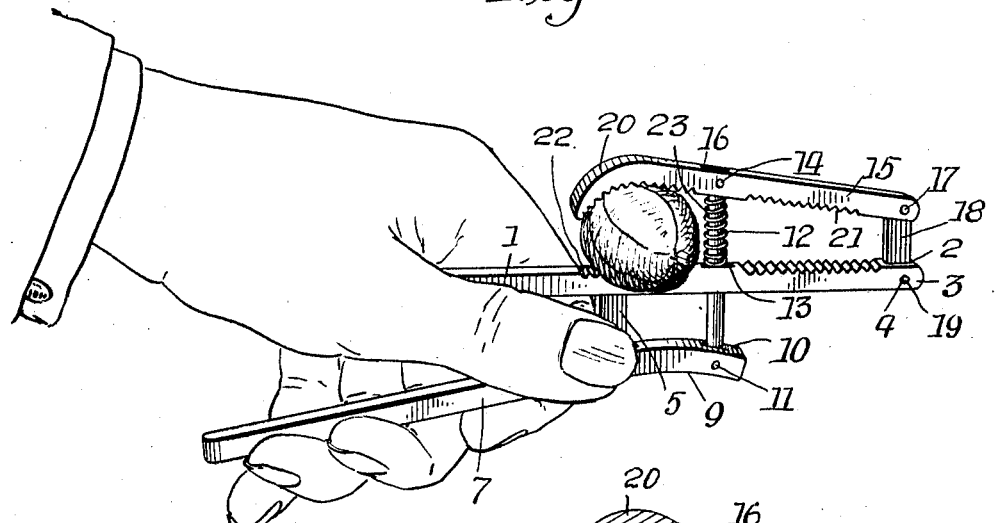
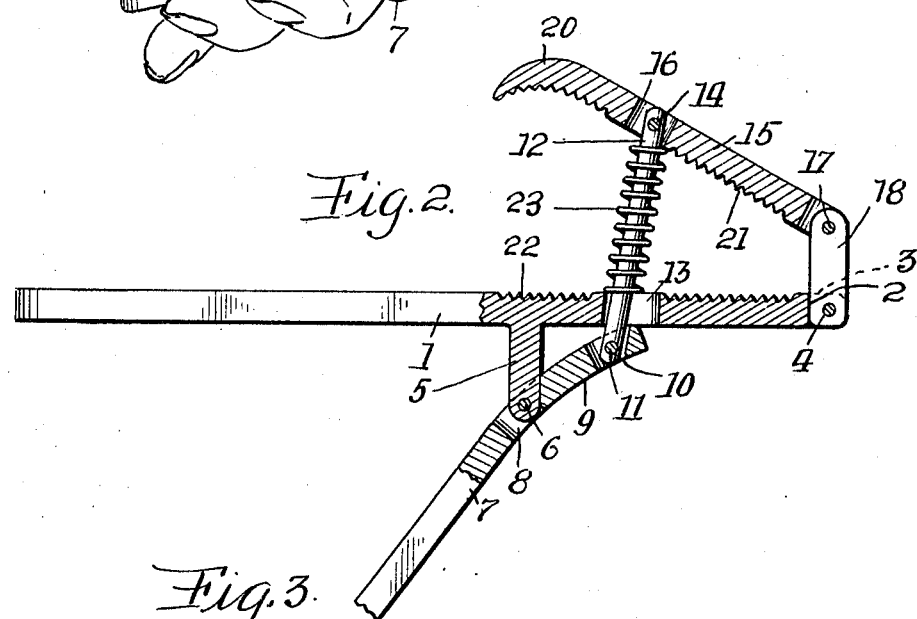
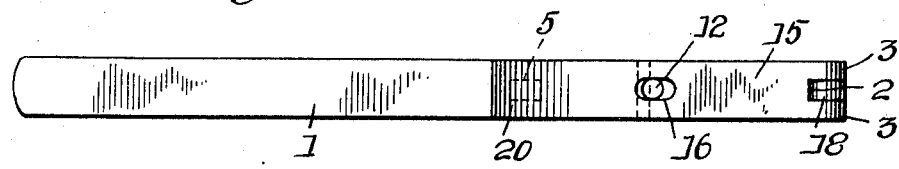
WITNESSES:
Samuel Payne
K. H. Butler
INVENTOR.
A. Konarski.
BY
N. C. Everts Co.
ATTORNEYS.

UNITED STATES PATENT OFFICE.

ANTONI KONARSKI, OF NEW YORK, N. Y.

NUTCRACKER.

1,003,917.     Specification of Letters Patent.     Patented Sept. 19, 1911.

Application filed May 22, 1911. Serial No. 628,623.

*To all whom it may concern:*

Be it known that I, ANTONI KONARSKI, a subject of the Czar of Russia, residing at New York, in the county of New York and State of New York, have invented certain new and useful Improvements in Nutcrackers, of which the following is a specification, reference being had therein to the accompanying drawing.

This invention relates to nut crackers, and the objects of my invention are, first, to provide a simple and inexpensive device for easily and quickly cracking or crushing the shell of a nut; second, to furnish a device of the above type with novel means for normally maintaining the same in an open position; third, to provide a nut cracker that can be safely used without danger of pinching or injuring the hand, and fourth, to provide a device of the above type that can be manufactured at a comparatively small cost.

I attain the above objects by a mechanical construction that will be hereinafter specifically described and then claimed, and reference will now be had to the drawing, wherein:—

Figure 1 is a perspective view of the device, Fig. 2 is a side elevation of the same, partly broken away and partly in section, and Fig. 3 is a plan of the same.

A device in accordance with this invention comprises a bar 1 having the rear end thereof serving functionally as a handle and the forward end bifurcated, as at 2 to provide arms 3 which are apertured, as at 4. The bar 1 at a point approximately intermediate the ends thereof is provided with a hanger 5 and pivotally connected to the lower end of the hanger 5 by a transverse pin 6 is a lever 7, said lever having a longitudinal slot 8 providing clearance for the lower end of the hanger 5. The upper end of the lever 7 is curved, as at 9 and provided with a slot 10. Pivotally mounted in the slot 10 by a pin 11 is the lower end of a connecting rod 12. The connecting rod 12 extends through a slot 13 provided therefor in the bar 1, said rod having the upper end thereof pivotally connected by a pin 14 to an arm 15. The arm 15 has a slot 16 to receive the upper end of the rod 12, and the outer end of the arm 15 is bifurcated and pivotally connected by a pin 17 to a link 18, said link having the lower end thereof pivotally mounted by a pin 19 in the bifurcated forward end of the bar 1. The rear end of the arm 15 is curved downwardly, as at 20 and the underneath side of the arm is provided with transverse teeth or serrations 21 adapted to confront teeth or serrations 22 carried by the upper side of the bar 1.

Encircling the connecting pin 12, between the bar 1 and the arm 15 is a coiled retractile spring 23 adapted to normally maintain the arm 15 in an elevated position and the rear end of the lever 7 in a lowered position.

With the forward end of the arm 15 pivotally connected to the forward end of the bar 1, the gap between the arm and the bar tapers and can accommodate nuts of various sizes. Nuts placed between the bar and the arm are frictionally held and prevented from slipping by the teeth and serrations of the arm and bar, and when the rear end of the lever 7 is elevated toward the bar 1, the rear end of the arm 15 is lowered and sufficient pressure is brought to bear upon the shell of the nut to crack and crush the same, without necessarily injuring or crushing the kernel of the nut.

The device can be easily operated in one hand and the other hand used as a receptacle to receive the cracked and crushed particles of the nut, and as the bar 1 and the lever 7 can be made of any desired length, sufficient leverage can be brought to bear with one hand to crack and crush the most indurate nut.

The device in its entirety is made of strong and durable metal and can be suitably ornamented whereby it can be used and associated with the cutlery of a dining table.

What I claim is:—

A nut cracker comprising a bar having the rear end thereof constituting a handle and its forward end bifurcated and further provided intermediate its ends with an opening, a hanger integral with and depending from said bar intermediate the ends thereof, a link having its lower end pivotally connected in the bifurcated end of said bar, an arm arranged over said bar and having its forward end pivotally connected to the upper end of said link and provided intermediate its ends with an opening, a rod having its upper end pivotally connected in the opening of said arm and its lower end extending through the opening of said bar, and a lever pivotally connected intermediate its ends to said hanger and having its forward end pivotally connected to the lower end of said rod.

In testimony whereof I affix my signature in the presence of two witnesses.

ANTONI KONARSKI.

Witnesses:
ERNEST CIZEK,
THOMAS F. SMITH.

Copies of this patent may be obtained for five cents each, by addressing the "Commissioner of Patents, Washington, D. C."